H. W. HAYFORD.
CLAMP.
APPLICATION FILED AUG. 29, 1912.
1,083,880.
Patented Jan. 6, 1914.
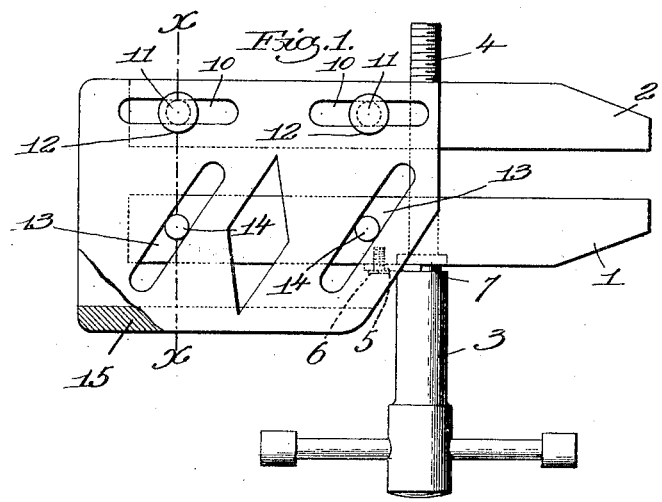
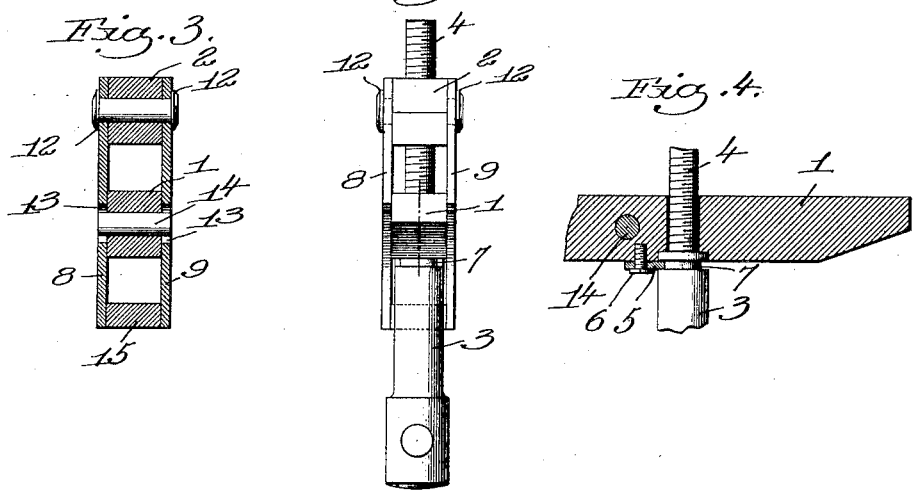
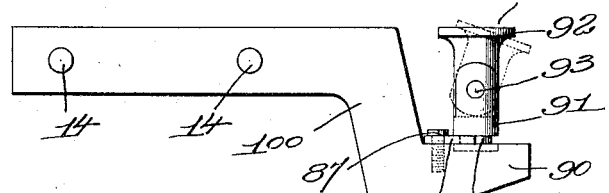

UNITED STATES PATENT OFFICE.

HERBERT W. HAYFORD, OF LACONIA, NEW HAMPSHIRE.

CLAMP.

1,083,880.

Specification of Letters Patent.

Patented Jan. 6, 1914.

Application filed August 29, 1912. Serial No. 717,710.

*To all whom it may concern:*

Be it known that I, HERBERT W. HAYFORD, a citizen of the United States, residing at Laconia, county of Belknap, State of New Hampshire, have invented an Improvement in Clamps, of which the following description, in connection with the accompanying drawing, is a specification, like characters on the drawing representing like parts.

This invention relates to clamps of that type embodying two jaws which are movable toward and from each other by means of a clamping screw, and the principal object of the invention is to provide a novel clamp of this nature in which the jaws can be moved toward and from each other by the action of a single screw, and which is provided with means for automatically maintaining the jaws in parallelism in all adjusted positions thereof.

Other objects of the invention are to simplify and improve generally clamps of this nature, all as will be more fully hereinafter described and then pointed out in the appended claims.

Referring to the drawings wherein I have shown some embodiments of my invention, Figure 1 is a side view of a clamp embodying the invention; Fig. 2 is an end view thereof; Fig. 3 is a section on the line $x$—$x$, Fig. 1; Fig. 4 is a sectional detail view showing the manner of swiveling the clamping screws to one of the jaws; Fig. 5 is a view showing a different style of jaw from that shown in Fig. 1.

Referring first to Figs. 1 to 4, 1 and 2 represent the two jaws of the clamp between which the work is gripped and 3 is the clamping screw by which the jaws are moved toward and from each other. In my invention a single screw only is required for this purpose. The screw 3 is swiveled to the jaw 1 and has screw-threaded engagement with the jaw 2. Said screw is shown as provided with a screw-threaded portion 4 which extends through an aperture in the jaw 2 and has screw-threaded engagement therewith, and said portion 4 extends loosely through an aperture in the jaw 1, as usual in devices of this nature.

A connection is provided between the jaw 1 and the screw 3 so that the jaw will be moved backward and forward with the screw while permitting the screw to turn freely in the jaw. The connection herein shown for this purpose comprises a plate 5 which is secured to the jaw 1 by some suitable means, such as a screw 6, and the edge of which is received in a groove 7 formed in the shank of the screw 3. The plate 5 may conveniently be provided with a slot so that when the screw 6 is loosened it can be withdrawn from the groove 7 to permit the screw 3 to be entirely removed.

The jaws 1 and 2 are moved toward and from each other by turning the screw 3 one way or the other, as will be obvious. In order to maintain the jaws in parallelism while they are being adjusted toward and from each other, I have provided a novel construction which automatically accomplishes this end without involving any attention on the part of the operator, so that the adjusting of the clamp involves merely the turning of the screw 3. The construction I have herein provided for this purpose and which constitutes the preferred embodiment of my invention comprises two side plates 8 and 9 between which the jaws 1 and 2 are received and which are provided with means for holding the jaws in their required parallel position. Each plate is provided with two sets of slots and each jaw is provided with pins which operate in said slots. The slots of at least one set must lie at an oblique angle to the length of the jaws. The slots of the other set may be parallel to the length of the jaws and the slots 10 with which the projections 11 of the jaw 2 operate, are so shown. Said projections preferably have heads 12 thereon which overlie the plates and prevent them from spreading. The slots which coöperate with the jaw 1 are shown at 13 and these lie at an oblique angle to the length of the jaws, as clearly seen in Fig. 1.

14 designate the projections extending from the jaw 1 and operating in the slots 13. The two plates are preferably rigidly connected together by the portion 15 on the under side thereof, although this construction is not essential.

In the operation of the device when the jaws 1 and 2 are moved toward each other the pins or projections 14 ride up the inclined slots 13, while the projections 11 move forwardly in the slots 10. On the other hand, when the jaws move away from each other the pins 14 move downwardly in the slots 13 and the pins 11 move backwardly in the slots 10. This arrangement of pins and slots is effective in maintaining the jaws 1 and 2 in parallelism, and this end is secured automatically and without any attention on the part of the operator who simply has to manipulate the screw 3 to secure the proper adjustment of the jaws.

The jaws shown in Figs. 1 and 2 are adapted for clamping articles having the opposite sides parallel. For clamping tapered articles, I may substitute the jaw shown in Fig. 5 for the jaw 1. This jaw which is designated 100 is provided with the offset portion 90 to which is detachably secured a member 91 having a portion 92 hinged thereto at 93 so that the clamping face 99 thereof can be swung into any desired position, as shown by the dotted lines in Fig. 5, to accommodate articles having tapered or inclined faces. This member 91 is detachably held in position by a plate 89, the edge of which occupies a groove 88 formed on the member 91 and which is held in place by a screw 87. The principal feature of my invention relates to means for maintaining at all times the jaws in parallelism, and while I have illustrated the preferred embodiment of my invention, I do not wish to be limited to the constructional details shown.

Having thus described my invention, what I claim as new and desire to secure by Letters Patent is:—

1. In a clamp, the combination with two jaws, of a clamping screw extending transversely through both jaws and having screw-threaded engagement with one jaw and being swiveled to the other jaw and means independent from said clamping screw for holding the jaws in parallelism, said means comprising two plates between which the jaws are mounted, each plate having two sets of slots and pins extending from said jaws and operating in said slots.

2. In a clamp, the combination with two jaws, of means for moving said jaws toward and from each other, two side plates between which the jaws are received, said side plates having two sets of slots, the slots of one set extending parallel to the jaws and the slots of the other set having an inclined position, and projections extending from the jaws and occupying said slots.

3. In a clamp, the combination with two jaws, of means for moving said jaws toward and from each other, two side plates between which the jaws are received, said side plates having two sets of slots, the slots of one set extending parallel to the jaws and the slots of the other set having an inclined position, and projections extending from the jaws and occupying said slots, the projections from one jaw occupying the slots of one set and those from the other jaw the slots of the other set.

In testimony whereof, I have signed my name to this specification, in the presence of two subscribing witnesses.

HERBERT W. HAYFORD.

Witnesses:
Thomas C. Hill,
George B. Munsey.

---

Copies of this patent may be obtained for five cents each, by addressing the "Commissioner of Patents, Washington, D. C."